United States Patent [19]
Abileah

[11] Patent Number: 5,737,045
[45] Date of Patent: Apr. 7, 1998

[54] LCD WITH NOTCH FILTER

[75] Inventor: Adiel Abileah, Farmington Hills, Mich.

[73] Assignee: OIS Optical Imaging Systems, Inc., Northville, Mich.

[21] Appl. No.: 532,099

[22] Filed: Sep. 22, 1995

[51] Int. Cl.⁶ .................................. G02F 1/1335
[52] U.S. Cl. ..................... 349/104; 349/106; 349/70
[58] Field of Search ............................ 359/66, 68, 103, 359/15, 22, 891; 349/70, 104, 105, 106, 107

[56] References Cited

U.S. PATENT DOCUMENTS

| | | | |
|---|---|---|---|
| 3,972,590 | 8/1976 | Gelber | 359/68 |
| 4,264,147 | 4/1981 | Baur et al. | |
| 4,506,956 | 3/1985 | Dir | 359/68 |
| 4,726,660 | 2/1988 | Rushford | |
| 4,793,691 | 12/1988 | Enomoto et al. | 359/68 |
| 4,870,484 | 9/1989 | Sonehara | 359/68 |
| 4,917,465 | 4/1990 | Conner et al. | |
| 4,929,061 | 5/1990 | Tominaga et al. | 359/49 |
| 4,976,514 | 12/1990 | Murata et al. | |
| 5,142,388 | 8/1992 | Watanabe et al. | |
| 5,146,355 | 9/1992 | Prince et al. | |
| 5,347,378 | 9/1994 | Handschy et al. | 359/53 |
| 5,414,542 | 5/1995 | Kawagishi et al. | |
| 5,414,546 | 5/1995 | Fergason | |
| 5,526,145 | 6/1996 | Weber | 359/66 |

FOREIGN PATENT DOCUMENTS 61-38930  2/1986  Japan ..................... 359/73

OTHER PUBLICATIONS

T. Scheffer et al "Twisted Nematic and Supertwisted Nematic Mode LCDs" Liquid Crystals Applications and Uses–vol. 1–1990 –chapter 10 –pp. 263–268.

Primary Examiner—William L. Sikes
Assistant Examiner—Tai V. Duong
Attorney, Agent, or Firm—Myers Liniak & Berenato

[57] ABSTRACT

A notch filter is provided in a RGB color twisted nematic liquid crystal display (LCD) apparatus, the notch filter preferably being located between the light source and the display panel. Undesirable peak(s) (e.g. blue-green) in the light rays from the source are substantially reduced or eliminated by the notch filter thereby improving the color saturation characteristics of the image reaching the viewer.

7 Claims, 6 Drawing Sheets

LCD WITH NOTCH FILTER

This invention relates to a liquid crystal display (LCD) and backlight therefor. More particularly, this invention relates to a liquid crystal display including a notch filter for improving color saturation of the image reaching the viewer.

BACKGROUND OF THE INVENTION

FIG. 1 is a side elevational cross-sectional view of a prior art LCD including fluorescent backlight 2 which emits light rays 1 that impinge upon the rear of the display panel and thereafter proceed therethrough and reach viewer 3. The LCD panel of FIG. 1 includes from the rear forward toward viewer 3, rear linear polarizer 5, rear substantially transparent glass substrate 7, a plurality of pixel electrodes 9, rear orientation or buffing film 11, liquid crystal layer 13, front orientation or buffing film 15, common electrode 17, red, green, and blue color filters 19, 20, and 21 respectively, front substantially transparent glass substrate 23, optional retarder 25, and finally front linear polarizer 27. This LCD may be of the normally black (NB) or normally white (NW) type, depending upon the orientation of the transmission axes of polarizers 5 and 27 as is known in the art. NW twisted nematic RGB (red, green, blue) triad LCDs are used for all graphs and charts herein.

Light rays 1, after reaching the display panel, are first polarized by rear linear polarizer 5. Then, the polarized light rays proceed through rear substrate 7, substantially transparent pixel electrodes 9, and orientation film 11 before reaching liquid crystal layer 13. When a voltage below the threshold voltage $V_{th}$ is applied to liquid crystal layer 13, the light rays are twisted thereby (e.g. about 90°) before reaching front orientation film 15. However, when voltage levels higher than the threshold voltage $V_{th}$ are applied to LC layer 13, the light rays are twisted as a function of the voltage as is known in the art. After traveling through LC layer 13, light rays 1 reach orientation film 15 and thereafter are transmitted through common electrode 17, one of color filters 19, 20, and 21, front substrate 23, and retarder 25 before being either blocked or permitted to pass by front linear polarizer 27.

Unfortunately, the colors of the image reaching viewer 3, which result from color filters 19–21, are often not as pure as desired. In other words, the portion of the image reaching viewer 3 by way of green filter 20 is often bluish-green as opposed to the desired green-green. Likewise, the portion of the image reaching viewer 3 by way of blue filter 21 is often blue-green as opposed to straight blue (pure blue is clearly desired). This results from unwanted peaks in the light 1 emitted from fluorescent source 2 as will be discussed below. Accordingly, there exists a need in the art for a liquid crystal display (LCD) and corresponding backlight which permit the image colors (e.g. red, green, and blue) reaching viewer 3 to have improved saturation (i.e. the green is green, the blue is blue, and the red is red).

Prior art FIG. 2 is a relative intensity vs. wavelength (nm) graph of the fluorescent light 1 emitted from source 2 of the LCD illustrated in FIG. 1. As can be seen in FIG. 2, backlight (and its source) 2 emits blue peak 31, green peak 33, and red peak 35. Unfortunately, blue-green peak 37 and red-green peak 39 are also emitted from backlight 2. Peak 37 in combination with the transmission characteristics of color filters 19–21 often cause the light reaching viewer 3 by way of blue filter 21 to be blue-green as opposed to straight blue. Likewise, the light or image portion reaching viewer 3 by way of green filter 20 is often caused to be blue-green as opposed to pure green as a result of blue-green peak 37 emitted from source 2 passing through the green color filter 20 in the LCD. As also will be appreciated by those of skill in the art, green-red peak 39 sometimes causes the portion of the image reaching viewer 3 by way of red filter 19 to be red-green as opposed to pure red (depending upon the transmission characteristics of the red filter) as a result of a portion of peak 39 passing through red filter 19.

FIG. 3 is a percent (%) transmission vs. wavelength (nm) graph of conventional color filters 19–21 in the prior art LCD of prior art FIG. 1. The triangular identified plot 41 represents the transmission of blue filter 21, while the square identified plot 43 represents the transmission of green filter 20 and the diamond identified plot 45 represents the transmission of red filter 19. As can be seen in FIG. 3, transmission curves 41 and 43, of blue filter 21 and green filter 20 respectively, overlap substantially in the area 44 of from about 450 nm–550 nm. Combining this with the presence of blue-green peak 37 (see FIG. 2) which extends from about 475 nm–510 nm, results in less than desirable saturation of the LCD colored image reaching viewer 3 via filters 20 and 21. In other words, because of blue-green peak 37 being present in the area of overlap 44 between filters 20 and 21, the portion of the image reaching viewer 3 by way of green filter 20 is not as "green" or pure as would otherwise be desired, and the portion of the image reaching viewer 3 by way of blue filter 21 is not as "blue" as would otherwise be desired because the light from blue-green peak 37 is permitted to pass through both blue filter 21 and green filter 20.

FIG. 4 is a CIE simulation graph plotting u' on the horizontal axis vs. v' on the vertical axis for the conventional LCD and corresponding backlight of prior art FIGS. 1–3, as a twisted nematic NW triad RGB LCD. The FIG. 4 graph is based on the known Committee Internationale L'Eclair (CIE) tri-stimulus curves and equations (1931) and on CIE 1976 UCS for u', v', and L, the disclosure of which is incorporated herein by reference. The "RGB-area" marks in FIG. 4 represent the red, green, and blue "area" coordinates to be explained later herein, while the corresponding squares represent the light reaching the viewer though that particular pixel (i.e. that particular color filter when a voltage below $V_{th}$ is applied thereto.

As can be seen in FIG. 4, the light reaching viewer 3 by way of blue filter 21 (or blue subpixel) has a u' value of 0.160 and a v' value of 0.261, while the light or image reaching viewer 3 by way of green filter 20 (or green subpixel) has a u' value of 0.109 and a v' value of 0.557. These u' and v' values shown in prior art FIG. 4 resulting from the conventional NW LCD of FIGS. 1–3 are less than desirable. There exists a need in the art to lower the blue v' value in order to improve saturation characteristics in the blue pixel or subpixel. Additionally, the green v' value is desired to be as high as possible (up to about 0.6) and the blue u' value is desired to be between about 0.10 and 0.19. It is desirable to have red u' values as high as possible (up to about 0.6). It is also desirable to have the red v' value as close to the upper right corner of the FIG. 4 horseshoe as possible.

Accordingly, there exists a need in the art for a liquid crystal display and corresponding backlight which improves the saturation characteristics of the colored image reaching viewer 3. It is desirable to make the blue colors reaching the viewer as "blue" as possible and the green colors reaching the viewer as "green" as possible (as opposed to the above-described blue-green shades). Such may be accomplished by eliminating unwanted backlight peaks (such as blue-green peak 37 and red-green peak 39 illustrated in FIG. 2).

It is a purpose of this invention to fulfill the above-described needs, as well as other needs apparent to the skilled artisan from the following detailed description of this invention.

SUMMARY OF THE INVENTION

This invention will now be described with respect to certain embodiments thereof, accompanied by certain illustrations wherein:

Generally speaking, this invention fulfills the above-described needs in the art by providing a color liquid crystal display (LCD) for providing a color image to a viewer, the display comprising:

a display panel including a liquid crystal layer and first and second color filters;

a fluorescent light source for emitting fluorescent light rays having both desirable and undesirable peaks toward the display panel; and a notch filter disposed between the color filters and the light source, the notch filter for substantially eliminating the undesirable peak so as to improve the color saturation characteristics of the image reaching the viewer.

This invention further fulfills the above-described needs in the art by providing a backlight for a color LCD, the backlight comprising:

a light source for emitting light rays toward a liquid crystal display panel, the light rays including red, green, and blue peaks in addition to at least one undesirable peak; and a notch filter for filtering the undesirable peak disposed optically forward of the light source so that the undesirable peak is substantially eliminated before the light from the source reaches the viewer by way of the panel.

This invention still further fulfills the above-described needs in the art by providing a method of making a twisted nematic color LCD, the method comprising the steps of:

providing a LCD panel having a plurality of different color filters;

providing a fluorescent light source behind the display panel so that light rays emitted by the source impinge upon the display panel and proceed therethrough toward the viewer; and disposing a notch filter optically forward of the source, the notch filter for substantially eliminating undesirable peaks in the light rays emitted by the source so as to improve color characteristics of the image reaching the viewer.

IN THE DRAWINGS

DETAILED DESCRIPTION OF CERTAIN EMBODIMENTS OF THIS INVENTION

Figure 5:
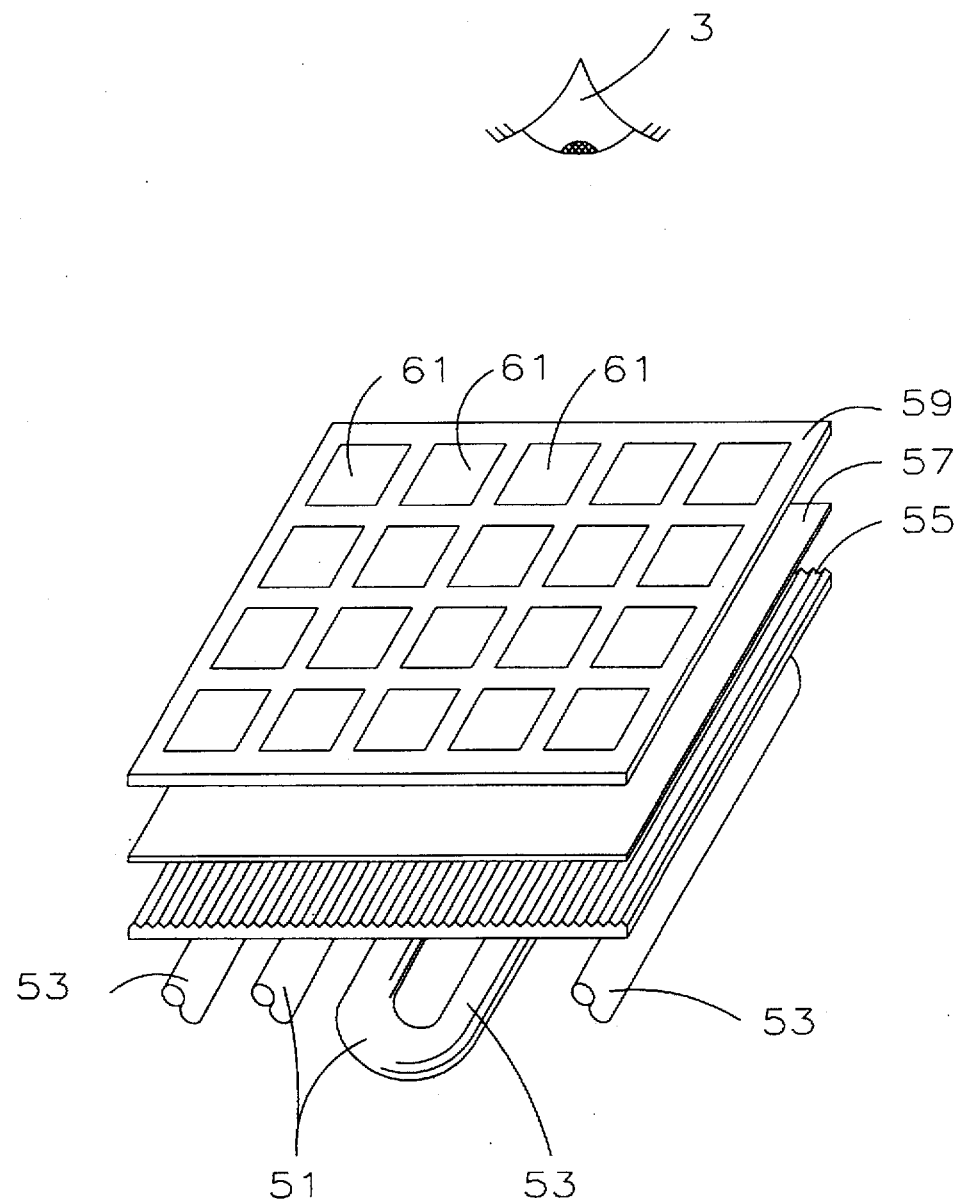
FIG. 5 is an exploded perspective view of a liquid crystal display (showing RGB tri-color striped display) including backlight according to an embodiment of this invention.

FIG. 5 is an exploded perspective view of a twisted nematic liquid crystal display according to an embodiment of this invention. This LCD and corresponding backlight include from the rear forward toward viewer 3, conventional fluorescent serpentine backlight source or lamp 51 including a plurality of tubular portions 53 which are substantially parallel to one another, faceted optical or brightness enhancing faceted lighting film (OLF or BEF) 55 (see U.S. Pat. No. 5,161,041) for substantially collimating and/or image splitting the light as it proceeds from source 51 toward the display panel, notch filter 57, and finally liquid crystal display panel 59 including individual colored pixels or subpixels 61 defined therein. This liquid crystal display may be of the normally black or normally white twisted nematic type according to alternative embodiments of this invention. However, a NW triad-type RGB TN display is used for all figures, graphs, charts, etc. herein.

Figure 1:
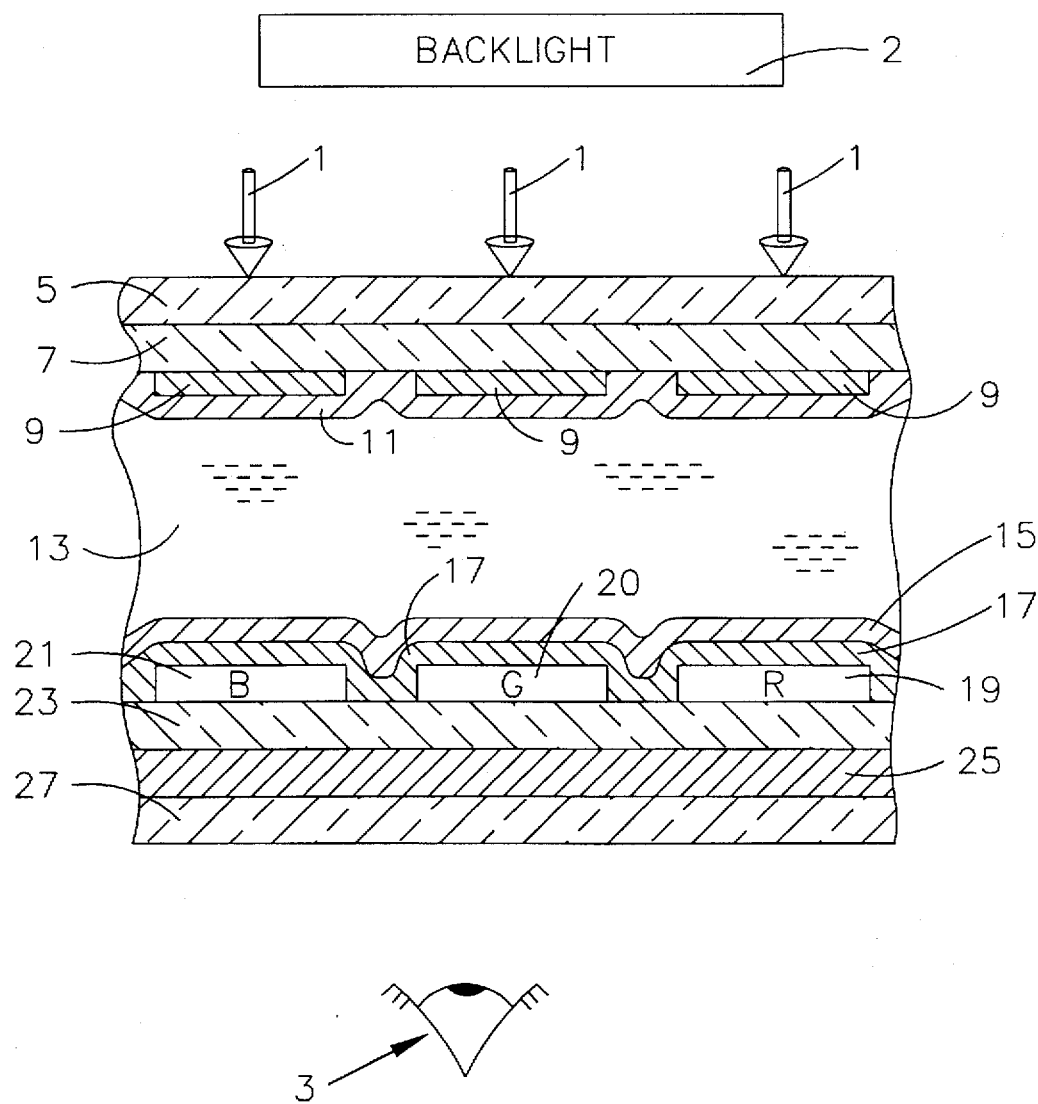
FIG. 1 is a side elevational cross-sectional view of a prior art triad TN liquid crystal display and corresponding backlight.

Display panel 59 of the FIG. 5 LCD is similar to that of FIG. 1, panel 59 including rear and front polarizers 5 and 27 respectively, substrates 7 and 23, electrodes 9 and 17, buffing films 11 and 15, liquid crystal layer 13, and red, green, and blue (RGB) color filters 19, 20, and 21 respectively. A separate colored filter is provided in each colored subpixel or pixel with, for example, a blue subpixel having a blue color filter and so on.

Figure 2:
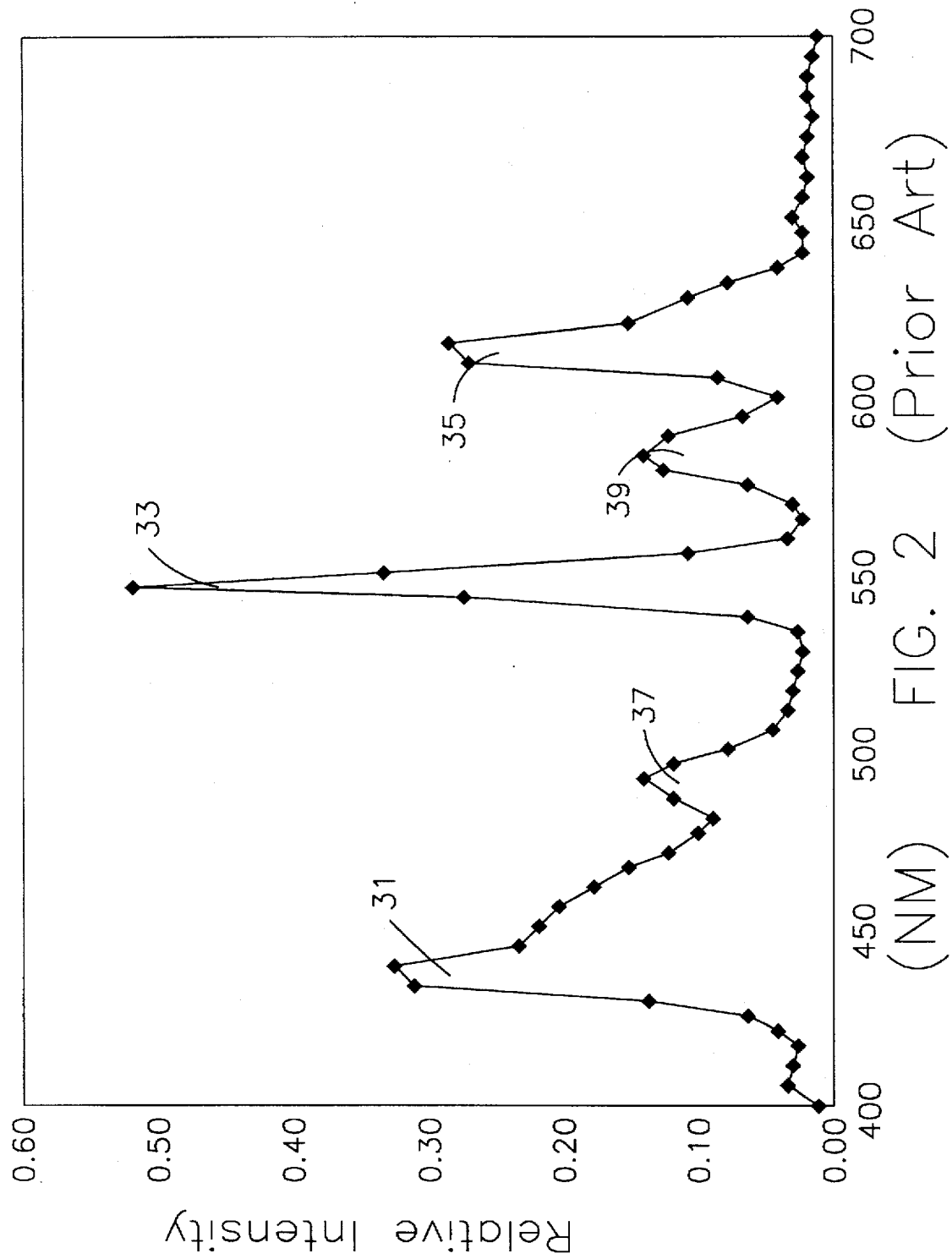
FIG. 2 is a prior art graph plotting the emittance of the fluorescent light source of FIG. 1 via wavelength in nanometers (nm) on the horizontal axis and relative intensity on the vertical axis.

Notch filter 57 is designed for the purpose of substantially eliminating either or both of peaks 37 and 39 shown in FIG. 2, these peaks being emitted by source 51. By eliminating one of or both of peaks 37 and 39, color saturation characteristics are improved with respect to the image reaching the viewer. In other words, the portion of the image reaching viewer 3 by way of, for example, blue filter 21 is "more blue" (not blue-green) and the portion of the image reaching viewer 3 by way of green filter 20 is "more green" (not blue-green), when blue-green peak 37 is eliminated by notch filter 57. Any type of known conventional filter may be used as notch filter 57 as long as the "notch" is positioned properly in the wavelength spectrum so as to reduce or eliminate undesired peaks. For example, a holographic notch filter made of a known photopolymer may be used as filter 57. Additionally, known multi-thin-layer deposition interference filters such as those available from Optical Coating Lab, Inc., Santa Rosa, Calif., may be used.

When filter 57 is designed to eliminate blue-green peak 37, then filter 57 may block transmission from the backlight source in the range of from about 490-495 nm, preferably from about 485-500 nm, and most preferably from about 475-510 nm. According to certain embodiments of this invention, filter 57 substantially blocks transmission from about 475-510 nm, but does not substantially affect transmission outside of this range thereby permitting the adjacent blue and green backlight peaks 31 and 33 respectively to proceed through filter 57 and thereafter through the blue and green color filters. Notch filter 57 preferably eliminates at least about 95% of the transmission in its range, most preferably at least about 99%. When notch filter 57 is designed to block red-green peak 39 (instead of or in addition to blue-green peak 37), the filter substantially blocks transmission at about 585-590 nm, preferably from about 570-595 nm, and may or may not be designed to not affect transmission outside of this range.

The peaks needed to be blocked by filter 57 are a function of the transmission characteristics of the color filters in the display panel 59 in combination with the light source emittance spectrum. For example, when the display panel color filters have transmission characteristics as set forth in FIG. 3, the peak 37 or 39 of most concern is blue-green peak 37 because of the large transmission overlap area 44 present between the blue and green filters. Red-green peak 39 is of lesser concern given the transmission characteristics of the filters set forth in FIG. 3, due to the relatively small transmission overlap area 46 of the red and green color filters. Thus, according to certain embodiments of this invention, notch filter 57 is designed to substantially block blue-green peak 37, while leaving alone or transmitting red-green peak 39.

Collimating film or layer 55 of the LCD may be OLF of the type set forth and described in commonly owned U.S. Pat. No. 5,161,041, the disclosure of which is hereby incorporated herein by reference. Alternatively, collimating film 55 may be BEF. Both BEF and OLF faceted collimating films are available commercially from 3M and known in the field of LCD backlights. The prisms or facets on the upper surface of film 55 are provided to both collimate and image split the light rays emitted from source 51. Backlight source 51 may be of any conventional fluorescent type, including the serpentine type shown in FIG. 5 which utilizes a plurality of spaced parallel arranged tubes 53. Source 51 may be a typical LCD backlight 12 watt serpentine fluorescent lamp having a spectral emittance as shown in FIG. 2.

A typical operation of a liquid crystal display of FIG. 5 will now be described. Firstly, source 51 emits light rays 1 toward display panel 59, such rays having, for example, the spectral characteristics shown in FIG. 2. The light rays are collimated and image split by film or lens 55 and thereafter proceed through notch filter 57. Notch filter 57 is designed to eliminate at least one (and possibly more) unwanted peak from the light emitted by source 51. Notch filter 57 may filter out, for example, blue-green peak 37 and/or red-green peak 39. After exiting notch filter 57, the filtered light rays proceed into display panel 59 through rear polarizer 5, proceed through twisted nematic liquid crystal layer 13 and exit the panel 59 by way of front linear polarizer 27. Depending upon the arrangement of the transmission axes of polarizer 5 and 27, display panel 59 may be of the normally white or normally black twisted nematic type. Notch filter 57 is preferably disposed between the source and the color filters but may be located elsewhere in the stack or panel provided that the targeted spectrum is filtered out before the image reaches viewer 3.

This invention will now be described with respect to the following example:

EXAMPLE

Figure 3:
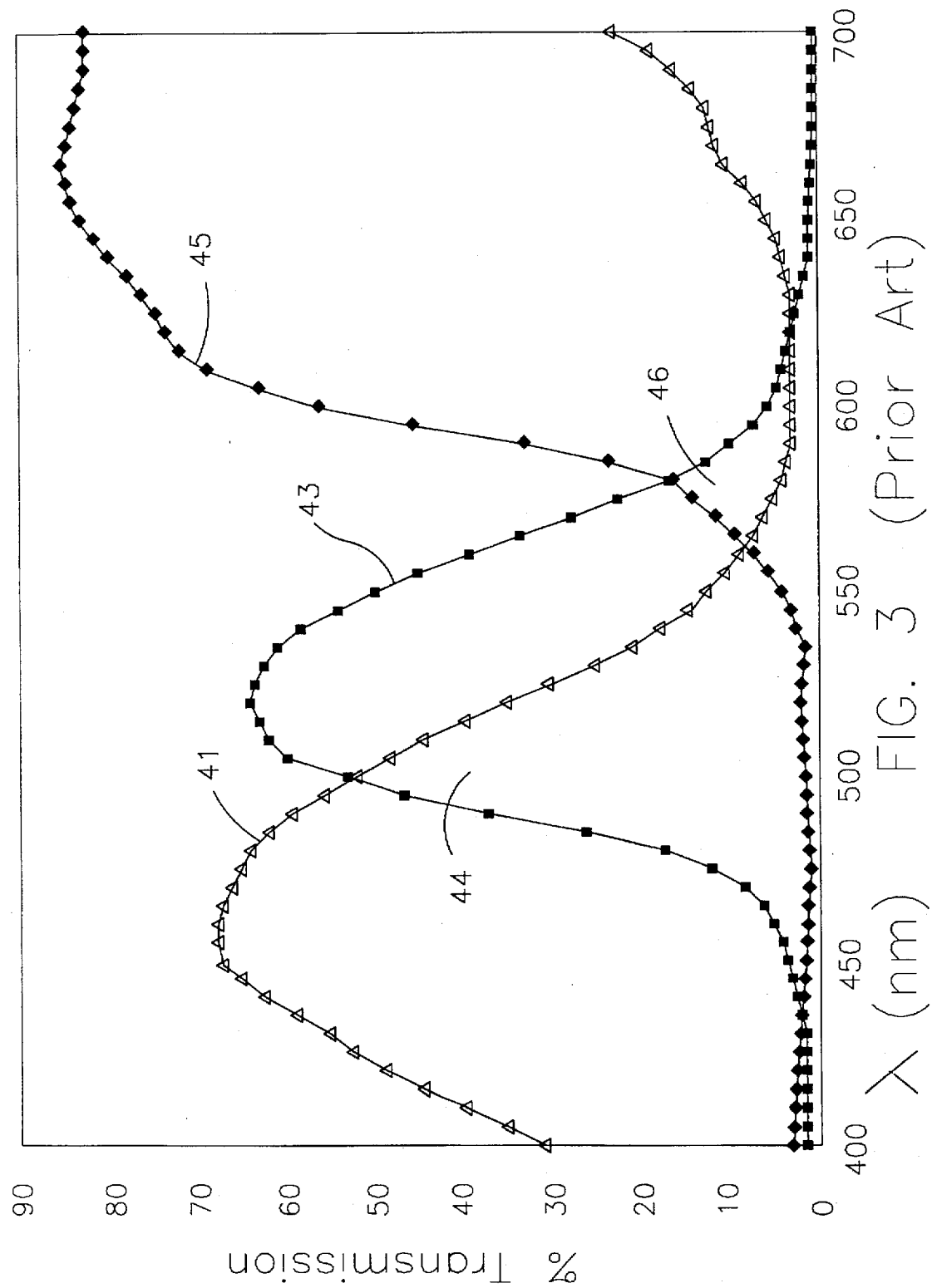
FIG. 3 is a prior art percent (%) transmission vs. wavelength (nm) graph of the transmission characteristics of the RGB color filters of FIG. 1.

A simulation was performed using a normally white (NW) twisted nematic liquid crystal display having a fluorescent backlight and a display panel substantially as shown in FIG. 1, but with a notch filter. The fluorescent backlight had an emittance of relative intensity vs. wavelength as shown in FIG. 2. The red, green, and blue triad of color filters in the LCD had transmission vs. wavelength characteristics as shown in FIG. 3. The display and corresponding backlight of this example are substantially shown structurally by FIG. 5, including fluorescent backlight source 51, collimating faceted BEF layer 55, holographic notch filter 57, and twisted nematic NW display panel 59. Notch filter 57 was located in between BEF 55 and panel 59 in this example. Panel 59 was of the NW RGB type, meaning that the red, green, and blue color filters 19, 20, and 21 respectively were arranged in a tri-color fashion as known in the art. The red, green, and blue color filters were of polyimide material and available from BSI, Rolla, Mo. Panel 59 included from the rear forward, a rear polarizer, rear transparent substrate, pixel electrodes, rear buffing film, twisted nematic LC layer, front buffing film, common electrode, RGB color filters, front substrate, and finally front linear polarizer. The transmission axes of the rear and front polarizers were arranged substantially perpendicular to one another so as to define a NW LCD. This NW LCD with notch filter (475-510 nm) was simulated, the results being set forth below in Chart 1 and in FIG. 6. The exact same LCD, without the notch filter 57, was also simulated, such results being set forth below in Chart 2 which is indicative of the prior art. The results set forth below in Chart 2 are substantially those resulting from the prior art display system set forth in FIGS. 1-4.

CHART 1

| Calculated from spectra: | | | Notch: 475-510 nm | Transmission | |
| --- | --- | --- | --- | --- | --- |
| Pixels | R | G | B | | Wht-all pixels |
| X = | 87.425 | 38.178 | 50.378 | | |
| Y = | 49.225 | 81.634 | 29.059 | | |
| Z = | 4.892 | 9.824 | 206.144 | | |
| x = | 0.6177 | 0.2945 | 0.1764 | | |
| y = | 0.3478 | 0.6297 | 0.1018 | | |
| u' = | 0.416 | 0.118 | 0.182 | | |
| v' = | 0.527 | 0.569 | 0.237 | | |
| % T = | 20.7% | 34.4% | 12.2% | % T = | 3.52% |
| yes/no | 1 | 1 | 1 | | |
| pix-CR | 80 | 80 | 80 | | |
| L = | 141.5 | 129.6 | 285.6 | | |
| Area: | R | G | B | Y | C | M |
| x = | 0.6034 | 0.2956 | 0.1798 | 0.4595 | 0.2150 | 0.3225 |
| y = | 0.3449 | 0.6121 | 0.1062 | 0.4776 | 0.2669 | 0.1850 |
| u' = | 0.407 | 0.121 | 0.184 | 0.235 | 0.149 | 0.282 |
| v' = | 0.523 | 0.565 | 0.244 | 0.550 | 0.416 | 0.364 |
| thk | 1.30 μm | 1.30 μm | 1.20 μm | | | |

CHART 2 (Prior Art)

| Calculated from spectra: | | | Notch: none | Transmission | |
| --- | --- | --- | --- | --- | --- |
| Pixels | R | G | B | | Wht-all pixels |
| X = | 87.468 | 38.976 | 52.693 | | |
| Y = | 49.454 | 88.400 | 38.280 | | |
| Z = | 5.377 | 20.749 | 230.444 | | |
| x = | 0.6147 | 0.2631 | 0.1639 | | |
| y = | 0.3475 | 0.5968 | 0.1191 | | |
| u' = | 0.414 | 0.109 | 0.160 | | |
| v' = | 0.526 | 0.557 | 0.261 | | |
| % T = | 19.5% | 34.8% | 15.1% | % T = | 3.63% |
| yes/no | 1 | 1 | 1 | | |
| pix-CR | 80 | 80 | 80 | | |
| L = | 142.3 | 148.1 | 321.4 | | |
| Area: | R | G | B | Y | C | M |
| x = | 0.5981 | 0.2646 | 0.1670 | 0.4317 | 0.1968 | 0.3021 |
| y = | 0.3445 | 0.5814 | 0.1231 | 0.4698 | 0.2701 | 0.1908 |
| u' = | 0.403 | 0.112 | 0.161 | 0.222 | 0.135 | 0.258 |
| v' = | 0.522 | 0.554 | 0.267 | 0.544 | 0.416 | 0.367 |
| thick | 1.30 μm | 1.30 μm | 1.20 μm | | | |

With respect to Charts 1 and 2 set forth above, holographic notch filter 57 used in the above Example (Chart 1)

filtered out substantially all wavelengths from about 475–510 nm, while the NW LCD of prior art Chart 2 did not include a notch filter. Other than this difference, the two heater inclusive NW-RGB LCDs and backlights were identical in structure (see 08/220,288 for a typical heater layer). The red, green, and blue polyimide filters of both were 1.30 µm, 1.30 µm, and 1.20 µm thick respectively, and the same fluorescent backlight source (FIG. 2) was used in both.

Numerous CIE coordinates were plotted for both NW LCDs for purposes of comparison, the results being set forth in Charts 1 and 2. Because blue-green peak 37 was substantially eliminated or suppressed by filter 57 in the Chart 1 NW LCD, the blue color coordinates u', v' of Chart 1 are a significant improvement over the blue coordinates u', v' of prior art Chart 2. In Chart 1, blue v' (pixel) was 0.237 compared with 0.261 in Chart 2. This is a significant improvement (i.e. drop) of the color characteristics of the blue pixel output. At the same time, the loss of blue pixel transmission resulting from the addition of the notch filter was only from 15.1% (Chart 2—prior art) down to 12.2% (Chart 1). However, this blue transmission loss did not substantially affect overall (on-state) LCD transmission, as it dropped only from 3.63% to 3.52% (% T). Again, overall green pixel transmission (% T) remained substantially the same (34.8% vs. 34.4%) coupled with this desirable increase in the green pixel coordinate v' value.

In addition to the red, green, and blue CIE "pixel" color coordinate discussed above, color "area" CIE coordinates were also simulated and set forth in Charts 1 and 2. The "pixel" CIE coordinates are based upon each colored subpixel analyzed individually, while the "area" CIE coordinates simulated are a function of the measured color pixel or subpixel relative to the other colors. For example, the blue "area" CIE coordinates (x, y, u', v') are measured when the blue colored pixel or subpixel is open (a voltage less than $V_{th}$ is applied thereto) and the red and green pixels are closed (a voltage such as 5–6 V greater than $V_{th}$ is applied to the LC in these pixels so that they appear dark in a NW LCD). Likewise, the green "area" CIE coordinates are taken when the green pixel is non-driven and the red and blue pixels are driven (V>$V_{th}$ where V equals 3.6–6.5 volts), and the red "area" CIE coordinates are taken when the red pixel is non-driven (it appears red) and the blue and green pixels are driven (they appear dark due to the high driving voltage).

While the "R", "G", and "B" columns in Charts 1 and 2 stand for the red, green, and blue pixels, the "Y", "C", and "M" columns stand for yellow, cyan, and magenta (purple) respectively. Yellow is measured with the red and green pixels fully open (non-driven) and the blue pixel fully closed (driven or darkened). The "C" area is measured when the green and blue pixels are fully open and the red closed, while the "M" area CIE coordinates are measured when the green pixel is closed and the red and blue are fully open.

The "yes/no" row in Charts 1 and 2 indicates that the NW LCD has red, green, and blue pixels or subpixels, while the "pix-CR" row sets forth contrast ratios (e.g. 80) for the driven vs. non-driven states. For example, the percent transmission (% T) of the red pixel in Chart 1 is 20.7% in the off-state (open or non-driven state), but the % T for this same red pixel or subpixel in the driven or "on" state is equal to 20.7% divided by 80 (pix-CR), or 0.259%. In a similar manner, % T for the green and blue pixels may be determined in the driven state using pix-CR. Additionally, the "L" row in Charts 1 and 2 represents relative luminance of the color leaving the pixel. In the Charts, "L" is set forth on a relative scale but may be measured in fL, or Cd per m².

In conclusion, it is clear from the CIE coordinates set forth above in Charts 1 and 2 with respect to both "pixel" and "area" measurements that the addition of the 475–510 nm notch filter 57 to the prior art display of FIGS. 1–4 significantly improves the color saturation characteristics of the image reaching the viewer.

Figure 6:
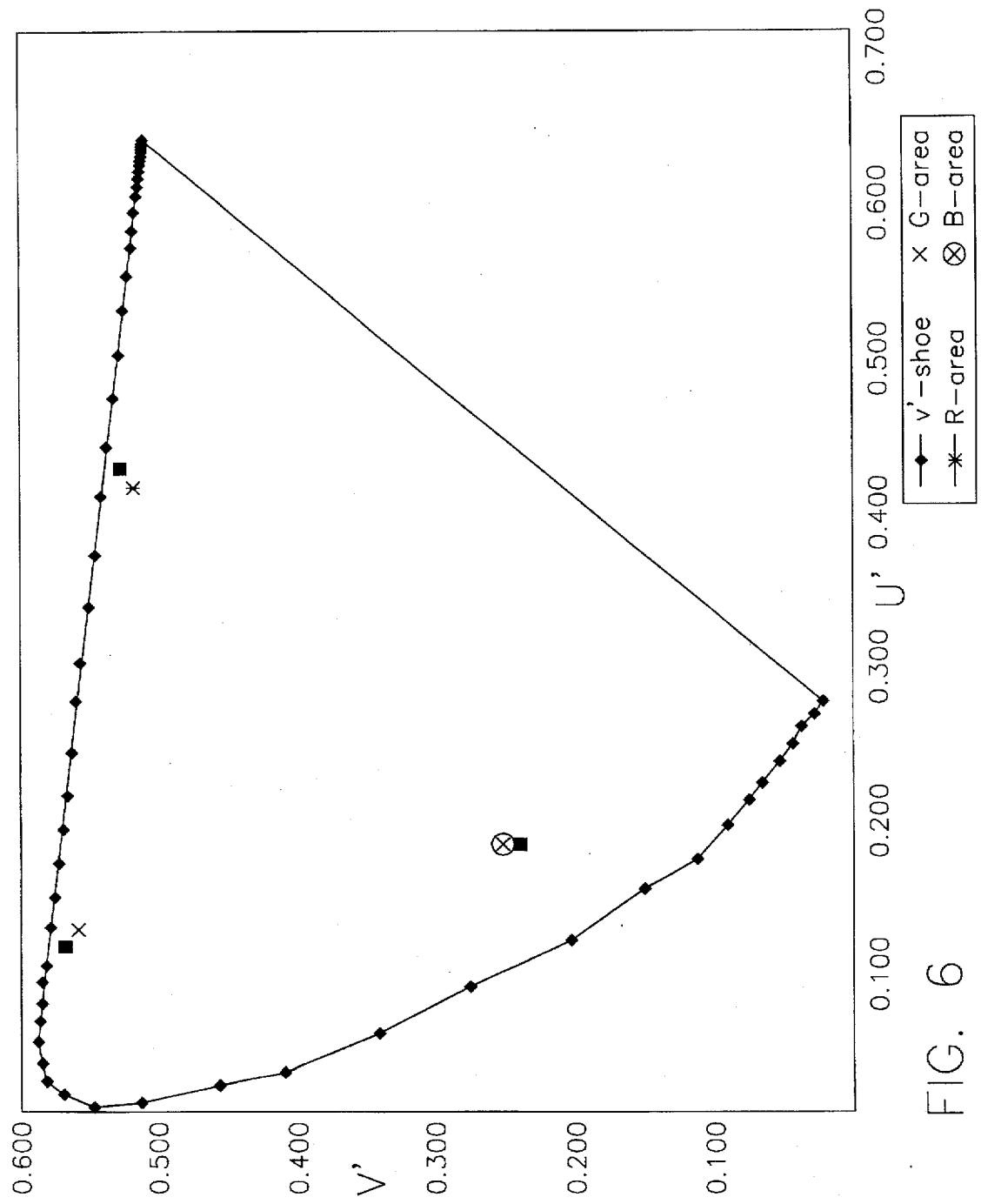
FIG. 6 is a CIE v' vs. u' simulation graph of the image reaching the viewer from the NW triad-type TN RGB display and backlight of FIG. 5.

FIG. 6 is a CIE v' vs. u' graph of the notch filter including NW TN-LCD of FIG. 5, which is also set forth via CIE data in Chart 1. The vertical axis in FIG. 6 plots v' while the horizontal axis plots the CIE u' color coordinate. The solid squares represent the red, green, and blue "pixel" CIE measurements of Chart 1, while the X-like points shown in the legend represent the corresponding red, green, and blue "area" CIE coordinates on the CIE shoe as described above. As will be appreciated by those of skill in the art, the CIE "area" coordinates are more indicative of commercial performance.

Figure 4:
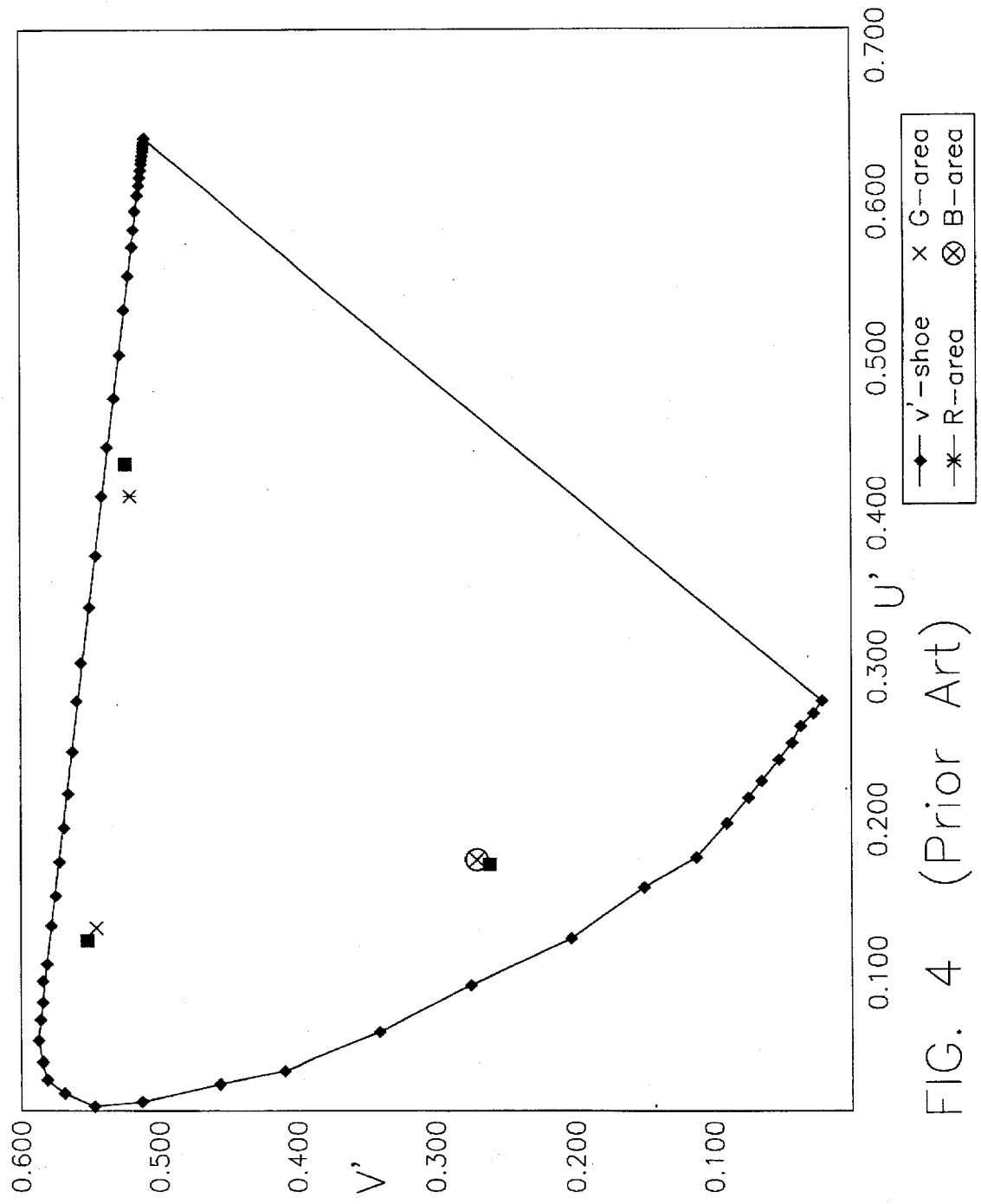
FIG. 4 is a CIE v' vs. u' simulation graph of the colored image reaching viewer 3 from the prior art display and backlight of FIGS. 1-3 when the twisted nematic display is of the NW triad type.

Comparing FIG. 6 (Chart 1) with prior art FIG. 4, the improvement in color saturation characteristics as a result of the notch filter addition can be seen. Pointedly, both the blue "pixel" and "area" locations moved from their respective FIG. 4 locations on the shoe vertically downward in the –v' direction, while the green v' "pixel" and "area" locations (coordinates) moved vertically upward in the +v' direction. The ideal location for the green coordinates is in the upper left corner of the shoe, while the ideal red position is in the upper right corner of the shoe shown in FIG. 6.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A color liquid crystal display, having a backlight, for providing a color image to a viewer, the liquid crystal display comprising:

a display panel including a liquid crystal layer and first, second, and third different color filters therein, said panel including a plurality of pixel electrodes which correspond to color filters on a one to one basis;

said backlight including: (i) a fluorescent light source (51, 53) for emitting fluorescent light rays having both desirable red, green, and blue peaks and an undesirable blue-green peak having light from at least 490–495 nm, toward said display panel; (ii) a collimating faceted layer (55) for collimating the light emitted from said source as it heads away from said source toward said display panel; and (iii) a 475–510 nm notch filter disposed between said color filters and said light source, said notch filter for substantially preventing said undesirable peak from reaching said color filters thereby improving the color saturation characteristics of the image reaching the viewer; and wherein said color filters are from 1.20–1.30 µm thick and said first color filter has a thickness less than said second and third color filters.

2. The display of claim 1, wherein said notch filter is holographic.

3. The display of claim 2, wherein said color filters are blue, green, and red, respectively.

4. The display of claim 1, wherein the blue portion of the image reaching the viewer by way of said blue color filter has a transmission of at least about 10%, a v' value less than about 0.250, and a u' value from about 0.10–0.19.

5. The display of claim 4, wherein the blue portion of the image reaching the viewer by way of said blue filter has a v' value less than about 0.240 and a transmission of at least about 12%.

6. The display of claim 5, wherein the portion of the image reaching the viewer by way of said green filter has a v' value greater than about 0.565 and a transmission of greater than about 30%.

7. The display of claim 6, wherein said green transmission is greater than about 34%.

* * * * *